United States Patent [19]
Thomsen et al.

[11] Patent Number: 6,064,409
[45] Date of Patent: May 16, 2000

[54] SYSTEM AND METHOD FOR PROVIDING AUDIO PROBE AND DEBUGGING FEATURES IN A GRAPHICAL DATA FLOW PROGRAM

[75] Inventors: Carsten Thomsen; Jeffrey L. Kodosky, both of Austin, Tex.

[73] Assignee: National Instruments Corporation, Austin, Tex.

[21] Appl. No.: 08/799,956

[22] Filed: Feb. 14, 1997

Related U.S. Application Data

[63] Continuation-in-part of application No. 08/475,338, Jun. 7, 1995, Pat. No. 5,652,909, which is a continuation of application No. 08/125,460, Sep. 22, 1993, Pat. No. 5,481,740.

[51] Int. Cl.[7] .................................................. G06F 9/00
[52] U.S. Cl. ........................................ 345/978; 345/970
[58] Field of Search ................................. 395/500, 347, 395/398, 676, 356, 967, 977, 978, 970, 440, 339, 340, 526; 345/37; 391/356

[56] References Cited

U.S. PATENT DOCUMENTS

| | | | |
|---|---|---|---|
| 4,901,221 | 2/1990 | Kodosky et al. | 395/398 |
| 5,313,575 | 5/1994 | Beethe | 395/159 |
| 5,331,111 | 7/1994 | O'Connell | 84/602 |
| 5,371,553 | 12/1994 | Kawamura et al. | 398/734 |
| 5,377,318 | 12/1994 | Wolber | 395/397 |
| 5,625,764 | 4/1997 | Tsujimoto et al. | 395/135 |
| 5,652,909 | 7/1997 | Kodosky | 395/800 |
| 5,778,417 | 7/1998 | Kentish et al. | 711/100 |

OTHER PUBLICATIONS

Price et al, "A Principled Taxonomy of Software Visualization," Journal of Visual Languages and Computing, v. 4 n 3 p. 211, Sep. 1, 1993.

Di Giano et al, "Program auralization : sound enhancements to the program environment" http://www.idiom.com/~digi/papers/gi–92–paper/gi–92–paper.html, 1992.

Primary Examiner—Mehmet B. Geckil
Attorney, Agent, or Firm—Conley, Rose & Tayon; Jeffrey C. Hood

[57] ABSTRACT

An audio probe feature which enables a user to select a wire or connector connected to a graphical object and "hear" the signals propagating on the wire or input to/output from the object. This provides a more complete and more informative debugging environment for certain classes of signals. The present invention also provides various features for obtaining audial information regarding signals in the graphical program. A cursor driver icon is also disclosed which can be used in conjunction with the audio probe icon and which provides a motor driven audible cursor capability.

32 Claims, 10 Drawing Sheets

| Audio Probe Menu |
| --- |
| On / Off |
| Volume △▽ |
| Analog / Digital |
| Sampling Rate △▽ |
| Modulation |
| Amplitude / Frequency |
| Channel Selection |
| Sound Selection |

FIG. 8

SYSTEM AND METHOD FOR PROVIDING AUDIO PROBE AND DEBUGGING FEATURES IN A GRAPHICAL DATA FLOW PROGRAM

CONTINUATION DATA

This is a continuation-in-part of application Ser. No. 08/475,338 filed Jun. 7, 1995 now U.S. Pat. No. 5,652,909 for "Method and Apparatus for Providing Autoprobe Features in a Graphical Data Flow Diagram", which is a continuation of application Ser. No. 08/125,460 filed Sep. 22, 1993 for "Method and Apparatus for Providing Autoprobe Features in a Graphical Data Flow Diagram", which is now U.S. Pat. No. 5,481,740.

RESERVATION OF COPYRIGHT

A portion of the disclosure of this patent document contains material to which a claim of copyright protection is made. The copyright owner has no objection to the facsimile reproduction by anyone of the patent document or the patent disclosure as it appears in the Patent and Trademark Office patent file or records, but reserves all other rights whatsoever.

BACKGROUND OF THE INVENTION

1. Field of the Invention

The present invention relates to graphical systems for creating and executing data flow programs, and more specifically to a system and method for providing an audio or loudspeaker probe feature and improved debugging features in a graphical data flow program.

2. Description of the Related Art

In the field of instrumentation, computer systems are employed to model physical systems and emulate or control test and measurement hardware. An instrument is a device which collects information from an environment and displays this information to a user. Examples of various types of instruments include oscilloscopes, digital multimeters, pressure sensors, etc. Types of information which might be collected by respective instruments include: voltage, resistance, distance, velocity, pressure, frequency of oscillation, humidity or temperature, among others. An instrumentation system typically includes a general purpose computer system which controls its constituent instruments from which it acquires data which it analyzes, stores and presents to a user of the system.

Computer control of instrumentation has become increasingly desirable in view of the increasing complexity and variety of instruments available for use. U.S. Pat. Nos. 4,901,221 and 4,914,568 to Kodosky et al disclose a graphical system and method, i.e. a graphical programming environment, for modeling a process and for emulating or controlling instruments. The system and method disclosured in Kodosky et al allows a user to create a program by connecting graphical objects or nodes in a data flow manner. As the user constructs the data flow program, machine language instructions are automatically constructed which characterize an execution procedure which corresponds to the displayed procedure. Therefore, a user can create a text-based computer program solely by using a graphically based programming environment. This graphically based programming environment may be used for creating virtual instrumentation systems and modeling processes, as well as for any type of general programming.

When a graphical data flow program, also referred to as an iconic program, is created, each graphical object or node has one or more inputs for receiving data and one or more outputs for producing data. The graphical data flow program may also include one or more structure nodes which perform sequencing or looping functions in the program. When the program is executed, each node executes when it has received data at all of its inputs. Thus each node executes in turn and produces data on its one or more outputs that are provided to other nodes in the system.

One problem with creating a graphical data flow program, as with any program, is debugging the program to correct errors in the program. It would be desirable to view the data output from each node of a graphical data flow program as the program executes. More specifically, it would be desirable to be able to view the data flow program in operation during the debugging process.

U.S. Pat. No. 5,377,318 titled "Line Probe Diagnostic Display in an Iconic Programming System" and assigned to Hewlett Packard discloses a system which allows a user to select a line probe function during execution of an iconic program. When the line probe is selected, the iconic program stops executing and displays a message asking the user to select a connecting line in the program. When the user selects a line input to or output from an object, the line probe obtains information regarding the desired data and displays this data in a dialog box.

U.S. Pat. No. 5,481,740 for "Method and Apparatus for Providing Autoprobe Features in a Graphical Data Flow Diagram" and assigned to National Instruments discloses a system which automatically displays values produced by a plurality of nodes in a graphical data flow program as the program is executed. In this system, the user simply selects an autoprobe function prior to executing the program. During execution of the program, the system automatically displays data output from each node as each node is executed. This system also provides a feature wherein a bubble appears and propagates down the wires in the graphical data flow program to mark the movement of data as the block diagram executes. This provides the user with an indication of where in the block diagram action is occurring at a particular moment.

However, it would be highly desirable for a graphical programming system to have more intuitive debugging features which provide a greater amount of information to the user. It would also be desirable to provide a graphical programming environment which provides both visual and audial information regarding execution of a graphical program, such as a data flow program. It would further be desirable to provide improved output methods, such as audio output methods, for conveying information contained in charts and graphs.

SUMMARY OF THE INVENTION

The present invention comprises an audio probe feature which enables a user to select a wire or connector connected to a graphical object and "hear" the signals propagating on the wire or input to/output from the object. This provides a more complete and more informative debugging environment for certain classes of signals. The audio probe may also be connected to a graph or chart to hear signals displayed on the graph or chart. The present invention also provides various features for obtaining audio information regarding signals in the graphical program.

In the preferred embodiment, the user selects an audio probe function for a connector or wire input to or output from a node, or for a wire connecting two nodes. The audio probe icon preferably has an appearance of a loudspeaker. In one embodiment the audio probe icon is connected to the desired listening point in the program. During execution of the program, the system generates audio signals on the computer's speakers which correspond to the signals on the selected wire where the audio probe icon is connected. The audio probe or loudspeaker icon enables a user to hear a signal during execution or debugging. The loudspeaker probe preferably has a plurality of modes for listening to analog or digital signals.

In a first analog mode, the loudspeaker icon is used to listen to analog signals input to or output from a node. The loudspeaker icon also allows a user to speed up or speed down the effective sampling rate performed by a node. The user may also listen to the envelope of an analog signal or listen to multiple analog signals concurrently. The user can direct a first analog signal to modulate a second analog signal and hear the result. The user may also select between hearing the amplitude and the frequency of one or more analog signals.

In a second digital mode, the loudspeaker icon is used to listen to digital signals. For example, the user can convert single pulses to a family of programmable "blurp" sounds. This feature is useful in debugging graphical programs. For example, the user may set a plurality of execution check points or trace points which make various sounds when executing various program sections. For digital data streams, the user can listen to the data streams in either a one channel mode or two channel mode. In the one channel mode, the data stream simply drives a digital to analog converter. In the two channel node, the data word is split and each half drives a separate D/A converter for stereo sound. Alternatively, the work is split and each half modulates the other.

In an alternate embodiment, the user can select an audio autoprobe function. When this option is selected, the system audially generates sounds corresponding to signals output from each node as data propagates through the data flow program. As each node in the diagram executes or fires, a routine is invoked which audially generates the resultant data on the computer system's speakers. Thus, a user can select the audio probe feature and audially hear the data flow out each node as the block diagram executes.

The present invention also comprises a motor driven audible cursor, wherein a motor icon is connected to form the "driveshaft" of the cursor control knob on a graph or chart. The motor driven audible cursor can be configured to drive the cursor across the screen in a linear, exponential, or logarithmic rate. The loudspeaker icon can also be combined with the motor driven audible cursor. Thus the cursor or graph value is provided not only as a numeric or graphical value, but also provided as an audio output through the loudspeaker icon. This enables the user to listen to the graph. Also, the value of the cursor can be set to frequency or amplitude modulate an oscillator. Further, dual motor driven cursors may be configured to drive stereo speakers.

Therefore, the present invention comprises an audio probe feature for graphical programs. The present invention can be used with visual probing tools to provide a greater amount of information regarding performance or execution of a graphical program. The program invention further comprises a motor driven audible cursor which can be used in conjunction with the audio probe icon to hear the output of a graph.

BRIEF DESCRIPTION OF THE DRAWINGS

The purpose and advantages of the present invention will be apparent to those skilled in the art from the following detailed description in conjunction with the appended drawings in which:

FIG. 8 illustrates a menu used for selecting options for the audio probe;

DESCRIPTION OF THE PREFERRED EMBODIMENTS

Incorporation by Reference

The following U.S. Patents are hereby incorporated by reference in their entirety.

U.S. Pat. No. 4,901,221 titled "Graphical System for Modeling a Process and Associated Method," issued on Feb. 13, 1990.

U.S. Pat. No. 4,914,568 titled "Graphical System for Modeling a Process and Associated Method," issued on Apr. 3, 1990.

U.S. Pat. No. 5,301,336 "Graphical Method for Programming a Virtual Instrument" filed Jul. 12, 1989 and issued Apr. 5, 1994.

U.S. Pat. No. 5,291,587 titled "Graphical System for Executing a Process and for Programming a Computer to Execute a Process, Including Graphical Variable Inputs and Variable Outputs" filed Nov. 19, 1992 and issued Mar. 1, 1994.

U.S. Pat. No. 5,301,301 titled "Polymorphic Dataflow block Diagram System and Method for Programming a Computer" and filed Jan. 30, 1991.

U.S. Pat. No. 5,481,740 field Sep. 22, 1993 titled "Method and Apparatus for Providing Autoprobe Features in a Graphical Data Flow Diagram".

U.S. Pat. No. 5,481,741 field Sep. 22, 1993 titled "Method and Apparatus for Providing Attribute Nodes in a Graphical Data Flow Diagram".

Figure 1:
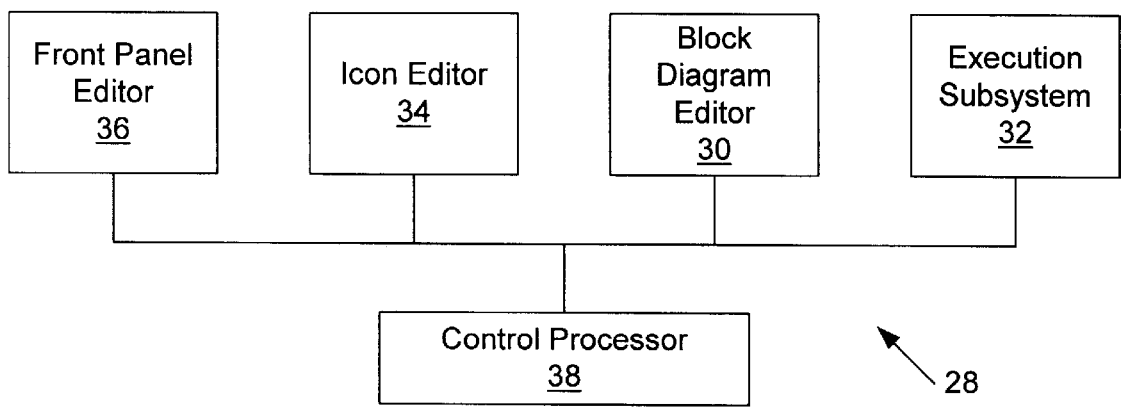
FIG. 1 is a block diagram illustrating a system for modeling a process and for emulating or controlling instruments according to the present invention.

Referring now to FIG. 1, a system 28 for modeling a process or creating a data flow program is shown. The system 28 includes a respective block diagram editor 30, an execution subsystem 32, an icon editor 34, and a front panel editor 36 all interconnected. The system 28 also includes a control processor 38 which connects to each of the front panel editor 36, icon editor 34, lock diagram editor 30 and execution subsystem 32. In the preferred embodiment, the block diagram editor 30, the front panel editor 36, the execution subsystem 32, and the icon editor 34 are constructed in software, i.e., are software programs which execute on a computer system. The control processor 38 in the computer system implements the above elements to form a graphical programming system.

Figure 2:
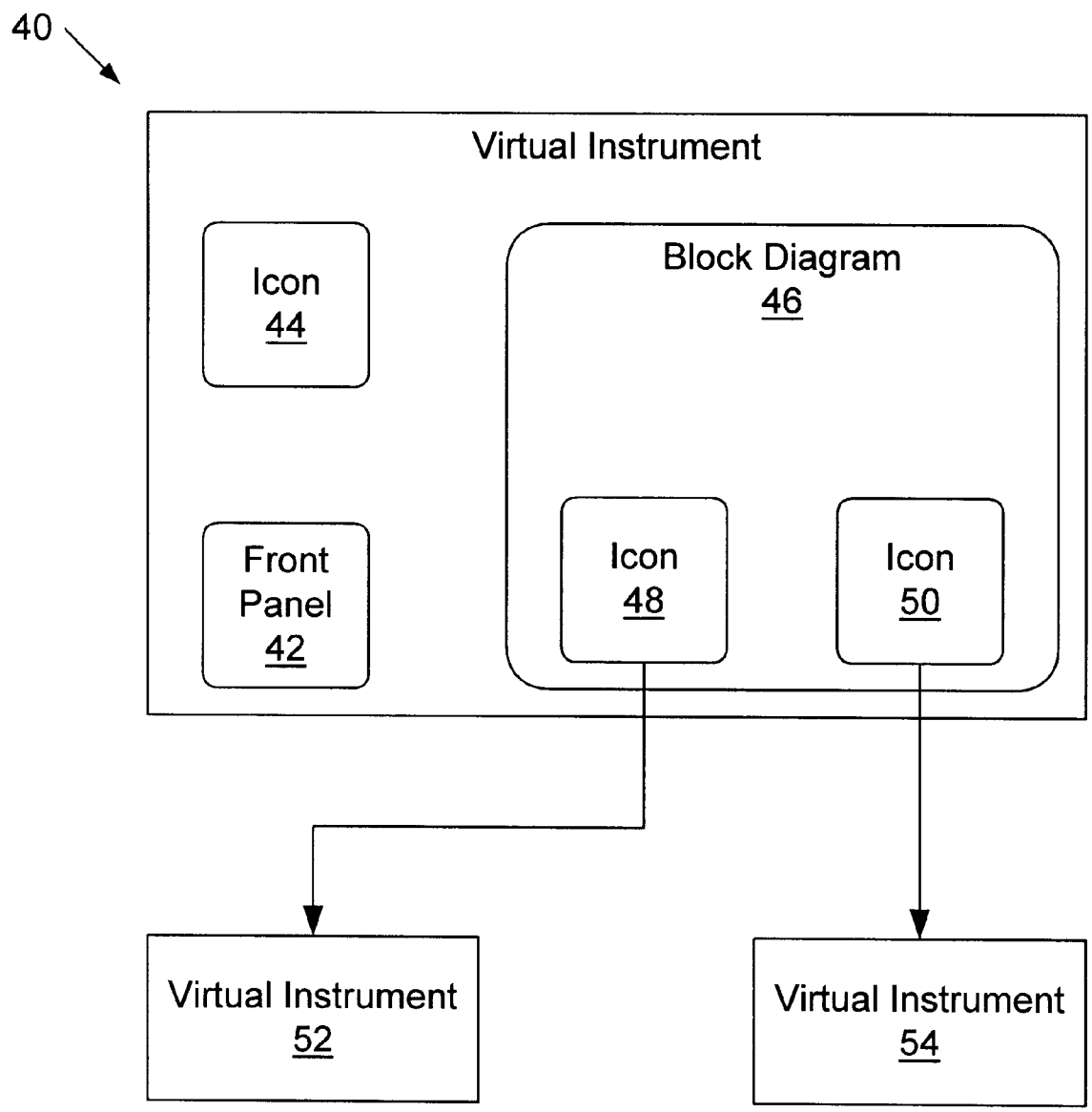
FIG. 2 is an illustrative drawing of a representation of a virtual instrument produced using the system of FIG. 1.

The system 28 can be used for a number of purposes, such as creating a graphical program. Referring now to FIG. 2, in the preferred embodiment the system 28 is shown primarily in creating "virtual instruments" (VIs), which are instruments including software and/or hardware components. However, the system 28 of the present invention has many other applications, including the creation of general purpose graphical programs, modeling processes, or any other type of general programming.

The block diagram editor 30 is used to construct and display a graphical program or diagram, referred to as a block diagram 46, which visually displays a procedure by which a value for an input various produces a value for one or more output variables. This procedure, together with the input and output variables, comprises a process model. Furthermore, as the user constructs the graphical diagram, the block diagram editor 30 constructs execution instructions which characterize an execution procedure which corresponds to the displayed procedure. In the preferred embodiment, the block diagram editor 30 constructs instructions in machine language which execute the block diagram created by the user. The execution subsystem 32 assigns at least one value to the input variable and executes the execution instructions to produce a value for the output variable.

The virtual instrument 40 includes a front panel 42 which permits interactive use of the virtual instrument 40 by a user. As will be explained more fully below, the front panel 42 permits graphical representation of input and output variables provided to the virtual instrument 40. The respective graphical representations on the front panel 42 for input and output variables are referred to as controls and indicators, respectively; although in some instances controls and indicators are referred to collectively as controls. The front panel editor 36 is used to create and edit the front panel 42.

Thus, the virtual instrument 40 includes a block diagram 46 which graphically provides a visual representative of a procedure or method by which a specified value for an input variable displayed in the front panel 42 can produce a corresponding value for an output variable in the front panel 42. In other words, the user uses the block diagram editor 30 to create a graphical program, and the resultant graphical icons appear in the block diagram 46.

The virtual instrument 40 also includes an icon 44 which permits use of the virtual instrument 40 as a subunit in other virual instruments (not shown). The virtual instrument 40 itself is a hierarchical construction which may comprise within its block diagram 46 respective icons 8 and 50 referencing other virtual instruments (sub-VIs) indicated generally by respective blocks 52 and 54. The block diagram 46 may also include one or more "primitives" corresponding to simple functions that may be performed. Together sub-VIs, primitives and other types of data processing elements comprised within the block diagram 46 are referred to as function icons. Function icons in the block diagram 46 have associated control means or software which implement the desired functions.

Figure 3:
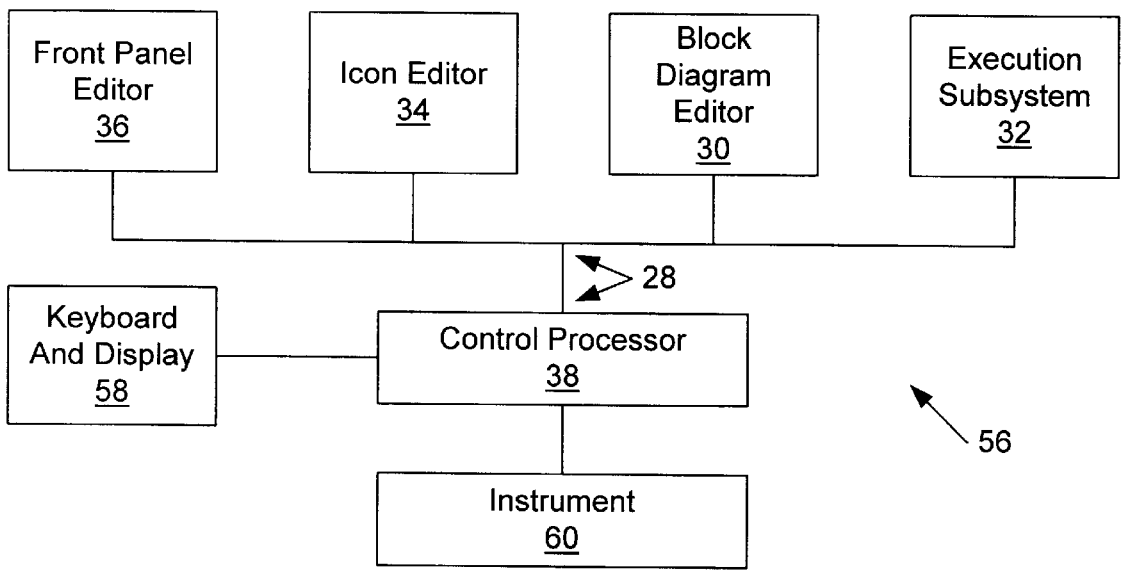
FIG. 3 shows a block diagram of an instrumentation system including the system of FIG. 1.

The generalized block diagram of FIG. 3 shows an instrumentation system 56 incorporating the system 28 shown in FIG. 1. Elements of the instrumentation system 56 which are substantially identical to those of second system 28 are designated with the same reference numerals as those of the system 28 for convenience. The instruementation system 56 includes a keyboard and display 58 and an instrument 60. In a presently preferred embodiment, the control processor 38 and the keyboard and display 58 may be implemented using any type of general purpose computer.

The instrumentation system 56 is preferably used to control the instrument 60, i.e., acquire data from the instrument 60, analyze that data, store that data, and present that data to the user in a meaningful way. The block diagram editor 30 can also be used to create virtual instruments as desired.

Figure 4:
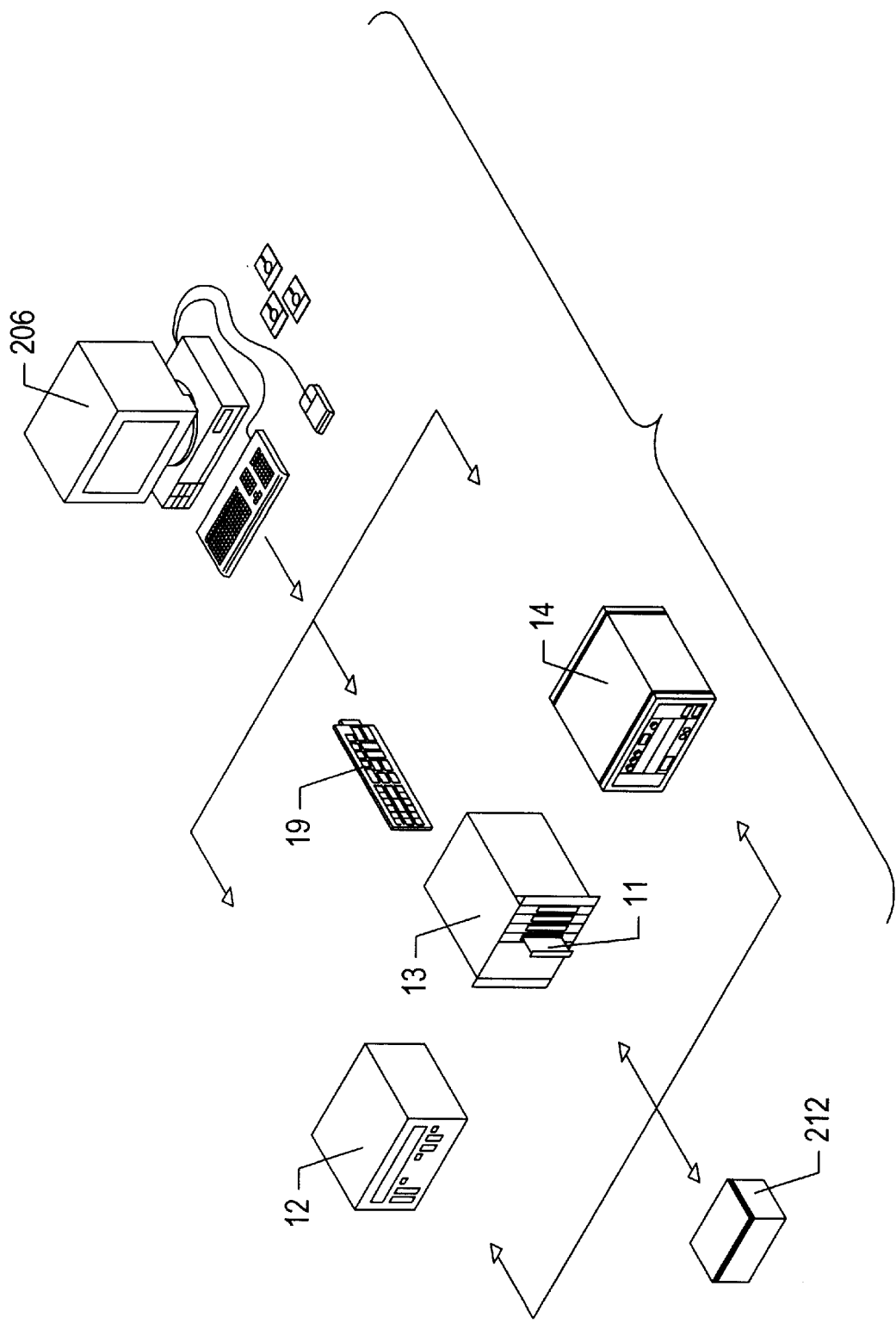
FIG. 4 is a representative drawing of various choices for an illustrative hardware instrumentation system of the preferred embodiment.

FIG. 4 illustrates various design choices available in an instrumentation system 204 in the preferred embodiment. As shown, a computer system 206 programmed according to the present invention can interface with a unit under test 212 i.e., can perform data acquisition and control of the unit under test 212, using a number of methods. These methods including using GPIB instruments 12, plug-in data acquisition boards 19 with associated signal conditioning logic 11, or VXI instruments 14. In addition a serial RS-232 method (not shown) can be used, as desired. It is noted that the computer 206 may be any type of computer including any type of Apple computer, IBM PC-compatible computer, PS/2, Sun workstation, etc.

Figure 5:
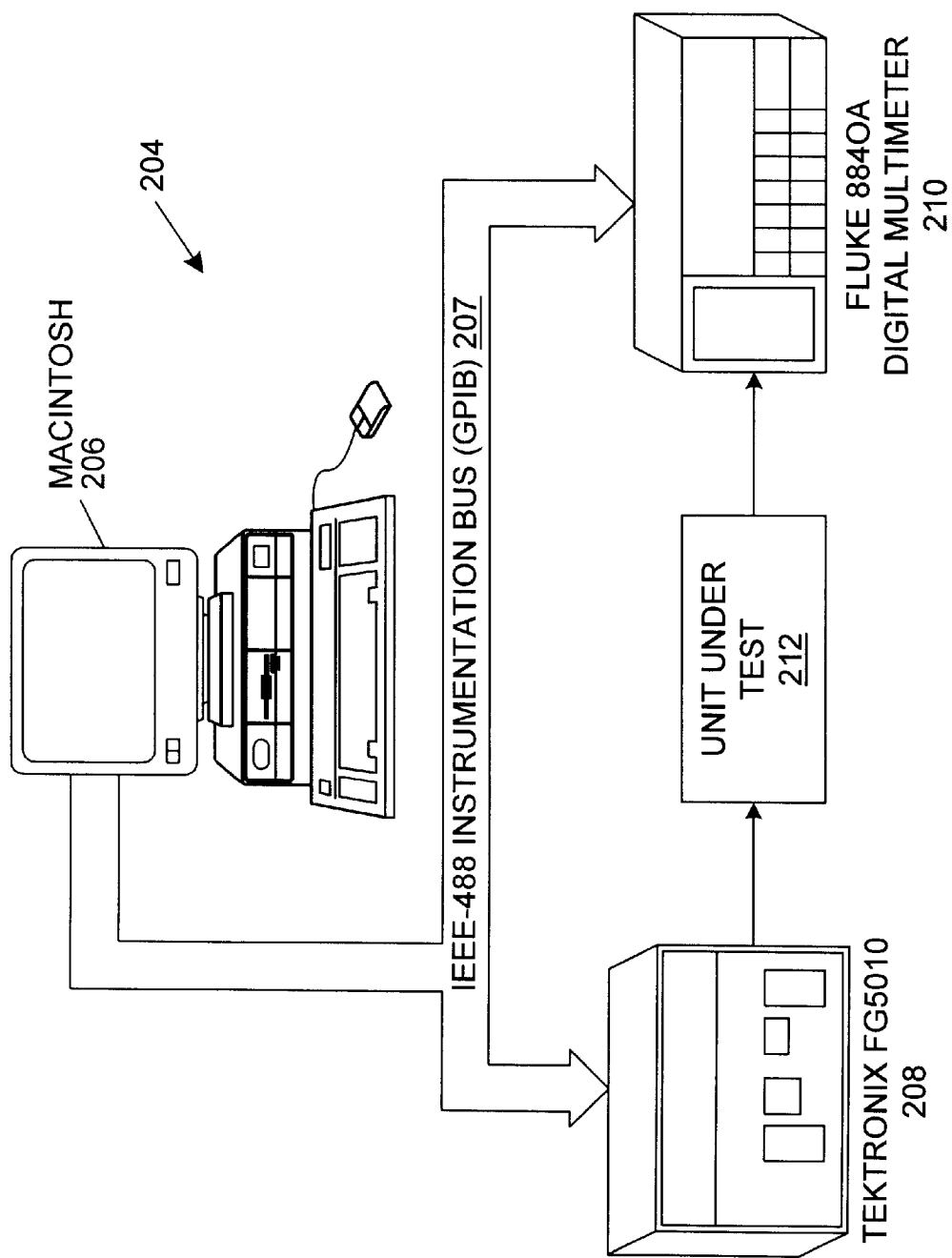
FIG. 5 is an illustrative hardware instrumentation system of the preferred embodiment.

FIG. 5 shows an illustrative hardware configuration of an instrumentation system 204 according to the present invention. The system 204 includes a computer 206 which includes the control processor 38 as well as the front panel editor 36, icon editor 34, block diagram editor 30, and execution subsystem 32. As previously mentioned the elements 30–36 are preferably implemented in software. The computer 206 illustrated in FIG. 5 includes an interface to a GPIB (general purpose instrument bus) 207 which in turn is connected to a Tektronix 5010 Function generator 208 and a Fluke 8840A digital multimeter 210. A unit under test 212 is coupled between the function generator 208 and multimeter 210 as shown.

It is also noted that other types of configurations for an instrumentation system 204 may be used. As discussed with regard to FIG. 5, instead of using actual instruments 208 and 210, the instrumentation system 204 may include one or more modualr instruments on plug-in boards in conjunction with the VXI bus specification. The plug-in board instruments would then assume the function of the function generator 208 and multimeter 210. In addition, instead of requiring instruments 208 and 210 or plug-in modular instruments, the computer 206 can include a data acquisition card including A-D (analog to digital) and D-A (digital to analog) converters, wherein the D-A converter generates waveform signals to the unit under test 212 and the output from the unit under test 212 is then provided through an A-D converter to the computer system 206.

Figure 6:
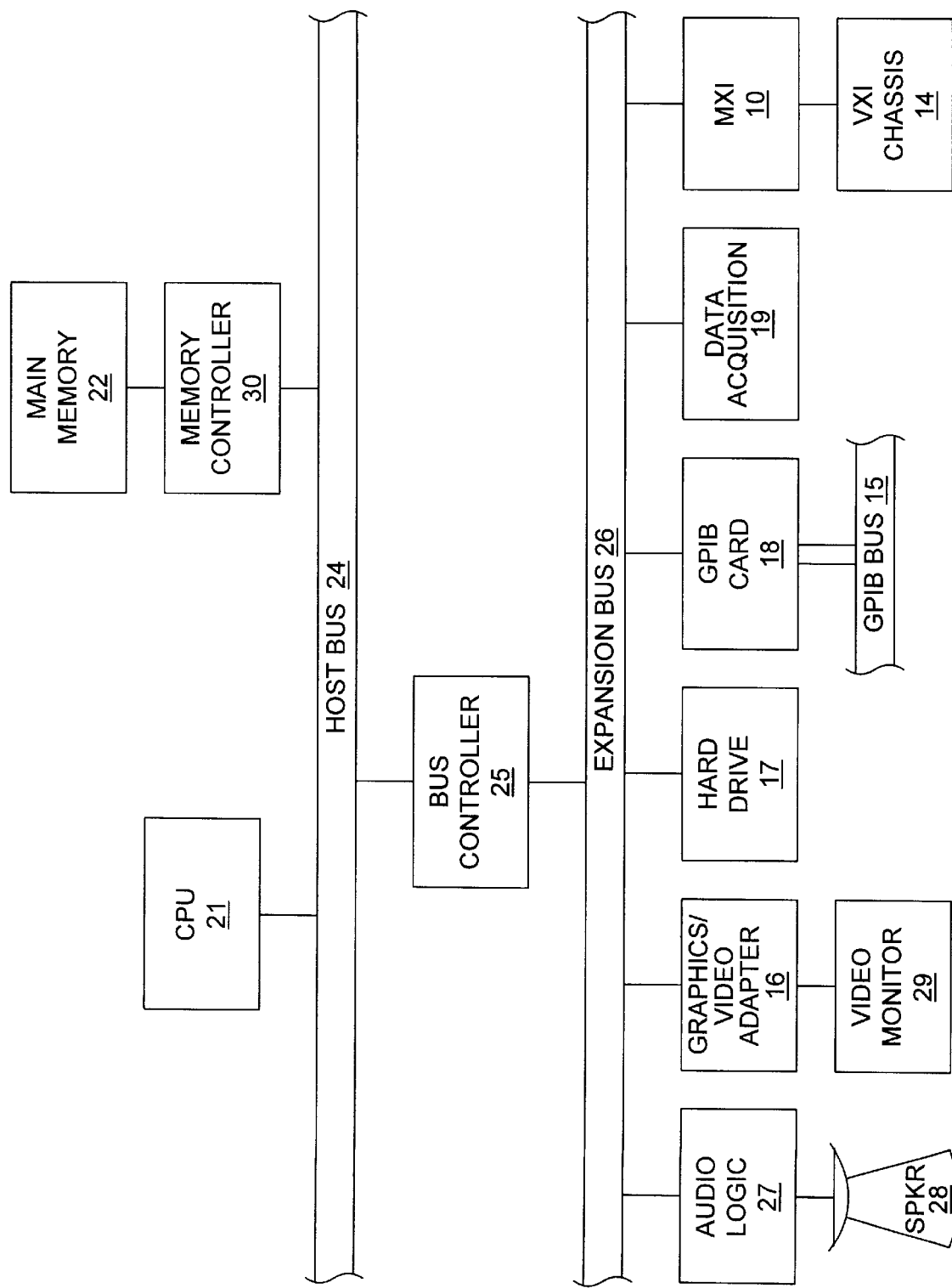
FIG. 6 is a block diagram of the computer system of FIGS. 4 and 5.

Referring now to FIG. 6, a block diagram of the computer system 206 is shown. The elements of a computer system not necessary to understand the operation of the present invention have been omitted for simplicity. The computer system 206 includes a central processing unit or CPU 21 which is coupled to a processor or host bus 24. The CPU 21 acts as the control processor 38. The CPU 21 may be any of various types, including an X86 processor such as the i486, Pentium, P6, or K5 processors, the PowerPC processor, or the DEC Alpha processor. Main memory 22 is coupled to the host bus 24 by means of memory controller 23. The main memory 22 stores the front panel editor 36, icon editor 34, block diagram editor 30 and execution subsystem 32.

Host bus 24 is coupled to an expansion or input/output bus 26 by means of a bus controller 25. The expansion bus 26 is preferably the Peripheral Component Interconnect (PCI) bus. Various devices are coupled to the expansion bus 26. A video/graphics adapter 16 is coupled to the expansion bus 26, and the video/graphics adapter coupled to a video monitor 29. Audio logic 27 is coupled to the expansion bus 26 and provides audio signals to speakers 28. The audio logic 26 is preferably a conventional audio card such as a SoundBlaster card or Soundblaster-compatible card, among others. It is noted that any of various audio and/or video subsystems may be used, as desired.

In one embodiment where the system and method of the present invention are used in an instrumentation application, a data acquisition card 19 is connected to the expansion bus 26. The data acquistion card 19 receives analog signals from an external transducer or sensor and in turn produces digital data that is provided to the CPU 21 and used by the system and method of the present invention. The computer system 206 also includes a GPIB (General Purpose Interface Bus) card 18 that interfaces to one or more instruments via the GPIB bus 15. The computer system 206 also includes an MXI card 10 that connects to VXI chassis 14.

Audio Probe Example

Figure 7:
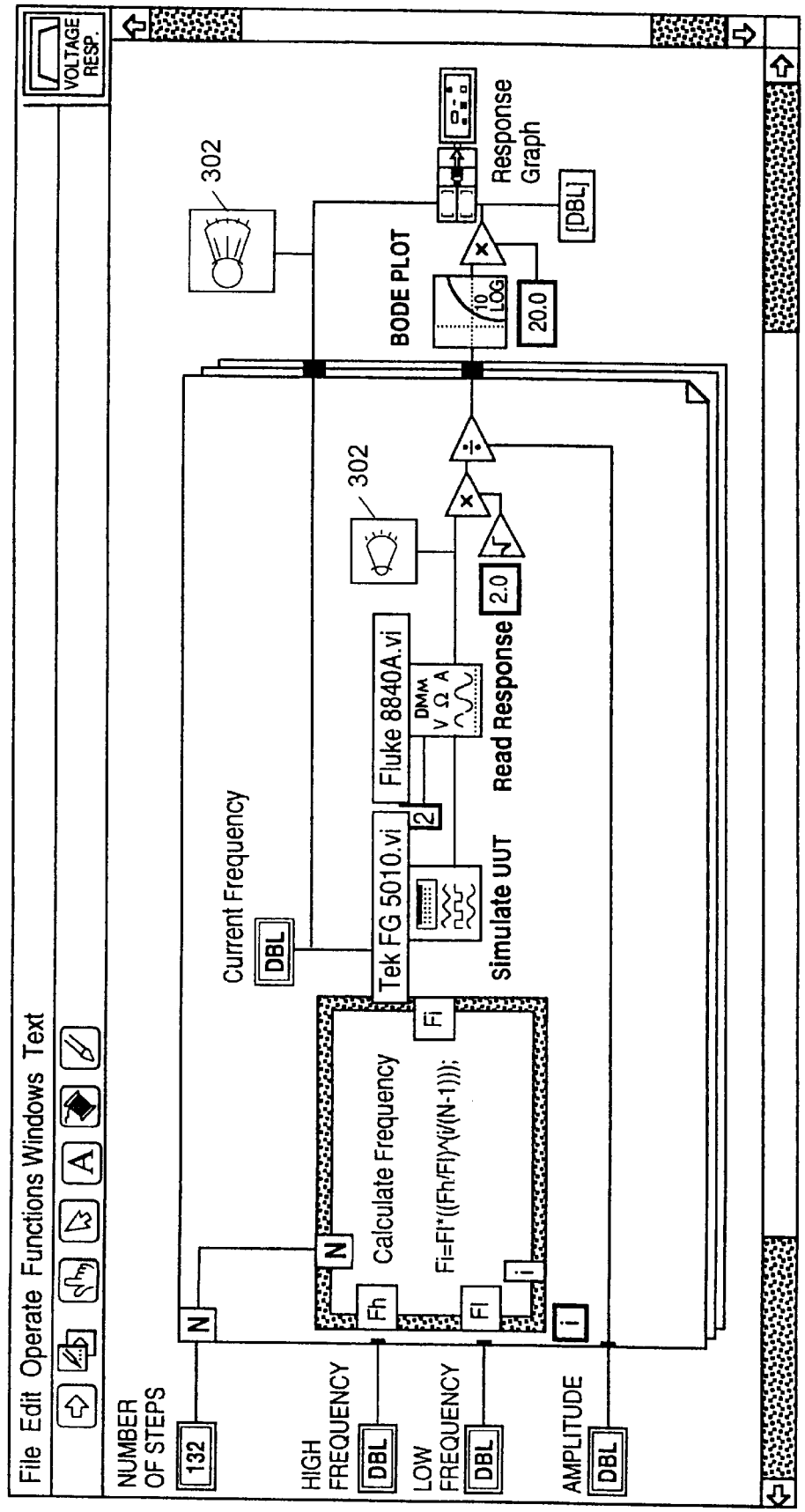
FIG. 7 illustrates an exemplary graphical program including an audio probe icon according to the present invention.

Referring now to FIG. 7, a computer generated display of a completed block diagram or data flow program for the instrumentation system 204 in FIG. 5 is shown. In FIG. 7, the block diagram or graphical program controls the output of the waveform generator 208 (Tek FG 5010) to the unit under test 212 and is also used to receive, analyze and present the output from the unit under test 212 which is provided from the multimeter 210 (Fluke 8840A).

As shown in FIG. 7, a user can place one or more audio probe icons 302 according to the present invention in the graphical program. In one embodiment, as shown in FIG. 7, the audio probe icon 302 graphically appears as a loudspeaker. Thus the audio probe icon 302 is also referred to as a loudspeaker icon. However, the audio probe icon 302 may have any of various appearances, as desired.

In the preferred embodiment, the user selects the audio probe icon 302 from a pull-down menu. The user then selects a connector or wire, or a node, and connects the audio probe icon 302 to the wire or noted, as shown. The user preferably drags the audio probe icon 302 As shown, the audio probe icon 302 is connected to the desired listening point in the program. The audio probe or loudspeaker probe icon 302 enables a user to hear a signal during execution or debugging. As discussed further below, the audio probe icon 302 may also be connected to controls and indicators on the front panel, as desired.

The graphical program can include one or more audio probes according to the present invention for listening to signals in the graphical program. In the embodiment of FIG. 7, the graphical program includes a first audio probe 302 connected to the output of the multimeter icon (Fluke 8840A.vi) and a second audio probe 302 connected to receive output from the Current Frequency input terminal. During execution of the program, the audio system in the computer system generates audio signals on the computer's speakers which correspond to the signals on the selected wire where the audio probe icon 302 is connected. Since the generation of sound in a computer system is well known in the art, details of this operation are omitted for simplicity.

Each audio probe icon 302 produces sounds as the signals or data "travel" down the respective wire where the audio probe icon 302 is connected. In one embodiment, the user only enables one audio probe icon 302 at a time. This enables the user to hear the selected output and/or input signals.

Audio Probe Menu

The audio probe icon 302 preferably includes a plurality of settings or controls which control the operation of the audio probe function. In one embodiment, the user right clicks on the probe icon 302 to display a menu. FIG. 8 illustrates the menu for the audio probe icon 302. As shown, the menu includes an on/off control, a volume control, an analog/digital control, a sampling rate control, a modulation control, an amplitude/frequency control, a channel selection control, and a sound selection control. Other mechanisms for selecting settings or controlling the operation of the audio probe 302 may be used, as desired.

The on/off control determines whether the audio probe 302 is on (producing audio signals) or off. The volume control enables the user to control the volume of the sound produced by the respective audio probe icon 302. The analog/digital selector selects between analog and digital modes for listening to analog or digital signals. In the preferred embodiment, the sampling rate control, modulation control, and amplitude/frequency control are highlighted and can be selected only when the analog signal selection is made. The channel selection mode and sound selection mode operations are preferably only available when the digital selection is made.

In the analog mode, the audio probe icon 302 is used to listen to analog signals input to or output from a node. The audio probe icon 302 also includes the sampling rate control to allow a user to speed up or speed down the effective sampling rate performed by a node. The user may also listen to the envelope of an analog signal or listen to multiple analog signals concurrently.

Figure 9:
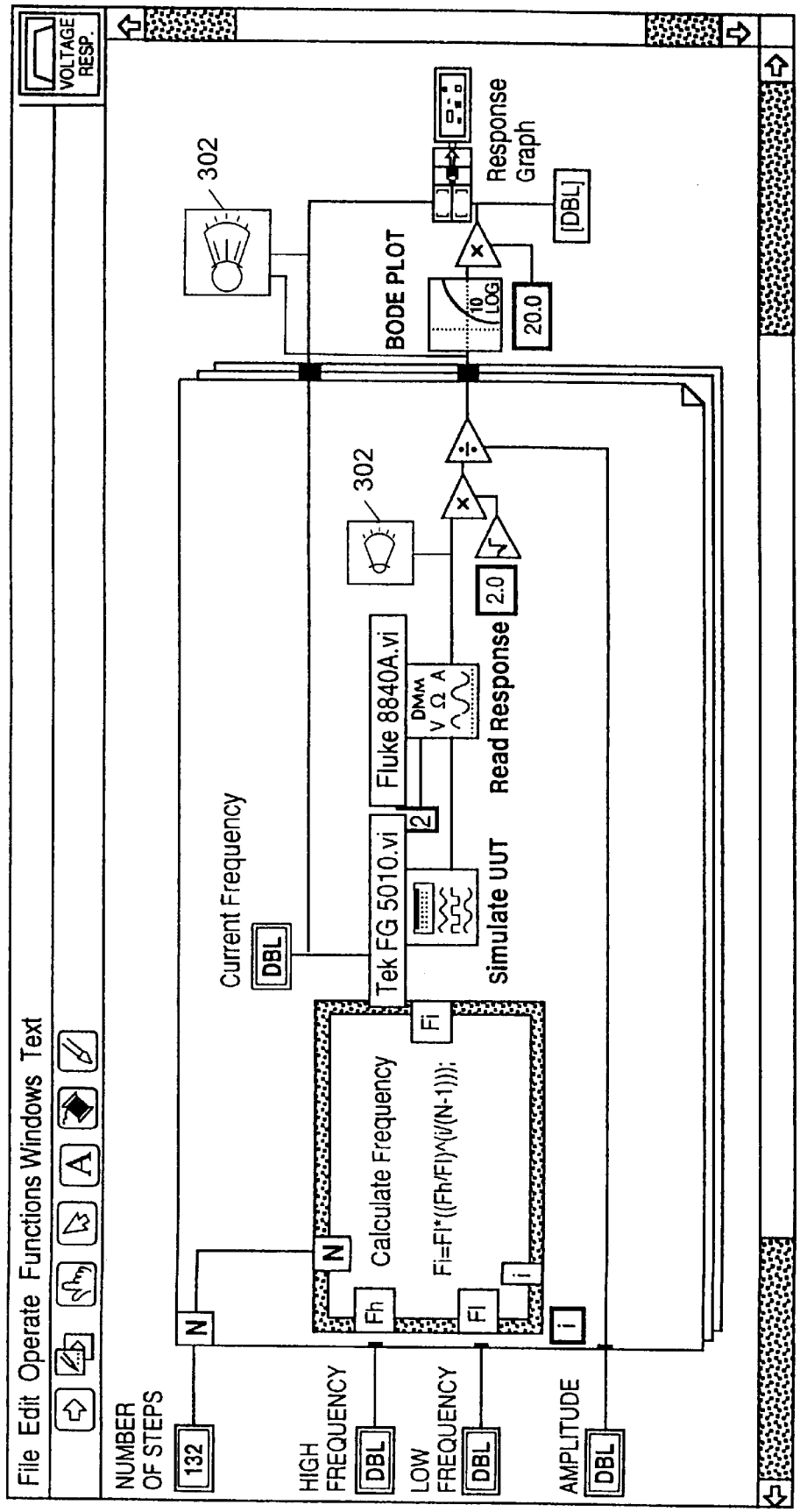
FIG. 9 illustrates a graphical program including an audio probe icon which receives two inputs and operates to modulate one input signal onto the other.

The user can use the modulation control to enable the audio probe 302 to direct a first analog signal to modulate a second analog signal and hear the result. In this mode, the user connects the audio probe icon 302 to receive two respective wires in the block diagram, wherein the wires carry first and second signals, as shown in FIG. 9. The user then selects which signal modulates the other. During execution of the program, the computer system generates audio signal outputs on the computer's speakers 28 which correspond to the modulated signal. The user may also select between hearing the amplitude and the frequency of one or more analog signals.

When the digital selection is made in the audio probe menu, the audio probe 302 may be used for listening to digital data. When the digital data option is selected in the menu of FIG. 8, the channel mode and sound selection options are highlighted. The channel mode option includes selections for one or two channel mode. Thus, for digital data streams, the user can listen to the data streams in either a one channel mode or two channel mode. In the one channel mode, the data stream simply drives a digital to analog converter. In the two channel mode, the data word is split and each half drives a separate D/A converter for stereo sound. Alternatively, the work is split and each half modulates the other.

The sound selection option enables the audio probe icon or loudspeaker probe icon 302 to generate specified sounds in response to digital signals. For example, the user can convert signal pulses to a family of programmable "blurp" sounds. This feature is useful in debugging graphical programs, wherein the user may desire to execute a block diagram and be alerted when various portions or sections of the program begin execution. In the preferred embodiment, the user can place a plurality of audio probe icons 302 at various places in the graphical program. The user can also specify sounds for each audio probe icon 302 to provide the checkpointing function. Thus, in one embodiment, this user selects sounds for each audio probe 302 to distinguish between the probes 302 and to provide a more clear audio indication of the point where the block diagram is executing. Alternatively, the audio probes 302 each generate sounds in response to the generated signals output from each respective node where the probe icon is connected.

For example, in one embodiment, such as that shown in FIG. 7, a plurality of audio probes 302 are placed throughout the program to provide an execution checkpointing feature, wherein each of the audio probes 302 generates various different sounds when executing various program sections. Thus when the graphical program is executed, as nodes execute in the program, the respective audio probe 302 generate audio outputs on the computer's speakers as the respective points in the program where the audio probes 302 are located receive signals. For example, the two audio probes 302 shown in the graphical program of FIG. 7 generate sounds when the respective portions of the graphical program execute. The two audio probes 302 shown in the graphical program of FIG. 7 can also be configured to generate specified sounds when the respective portions of the graphical program execute.

In one embodiment, the audio probe icon 302 operates in a similar manner to an attribute node for selecting sounds of the probe. For more information on attribute nodes, please see U.S. Pat. No. 5,481,741, referenced above. Thus, the user may select one or more sounds from a sound palate and associate the selected sound with the respective wire.

Audio Autoprobe Function

In an alternate embodiment, the user can select an audio autoprobe function. When this option is selected, the system audially generates sounds corresponding to signals output from each node as data propagates through the data flow program. As each node in the diagram executes or filers, a routine is invoked which audially generates the resultant data on the computer system's speakers. Thus, a user can select the audio probe feature and audially hear the data flow out each node as the block diagram executes. The audio probe feature can also be used with a visual probe feature to obtain a greater amount of information about the graphical program being executed. Thus, the user can immediately determine if one node is providing incorrect output. This provides a more useful debugging tool than that previously known in the art.

The audio autoprobe feature may be used in conjunction with a visual autoprobe feature, which operates to visually display the data output from the node in the proximity of the node's outputs. Thus, a user can select the autoprobe feature and both visually see and audially hear the data flow out each node as the block diagram executes.

Temperature VI

Figure 10A:
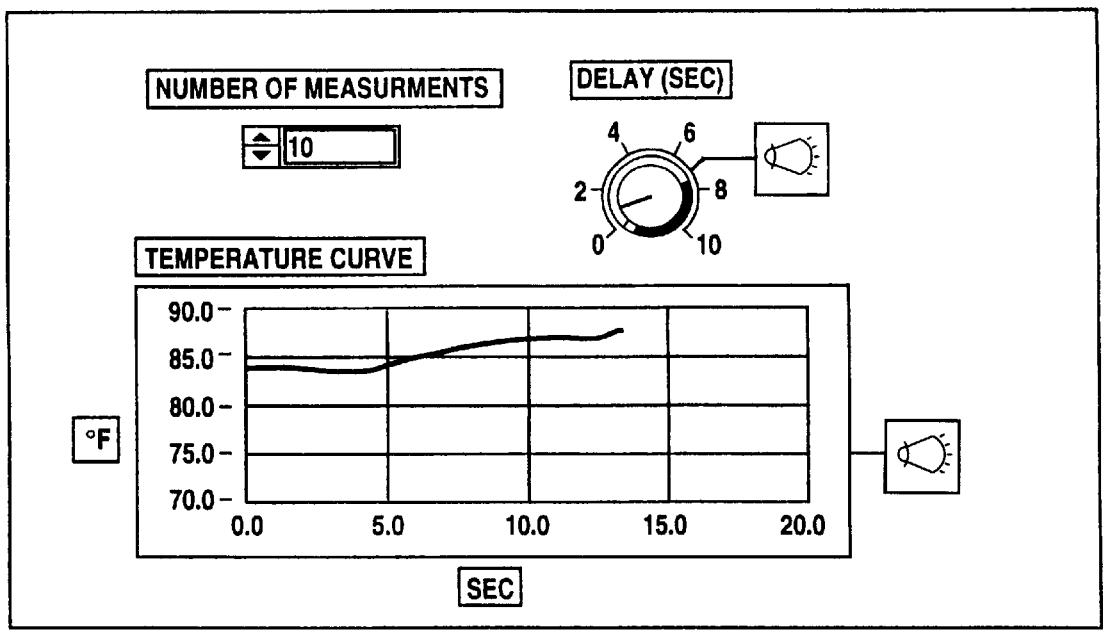
FIGS. 10A and 10B illustrate the front panel and block diagram of a graphical program, wherein audio probe icons are connected to a control and graph on the front panel and are also connected to a wire in the block diagram.
Figure 10B:
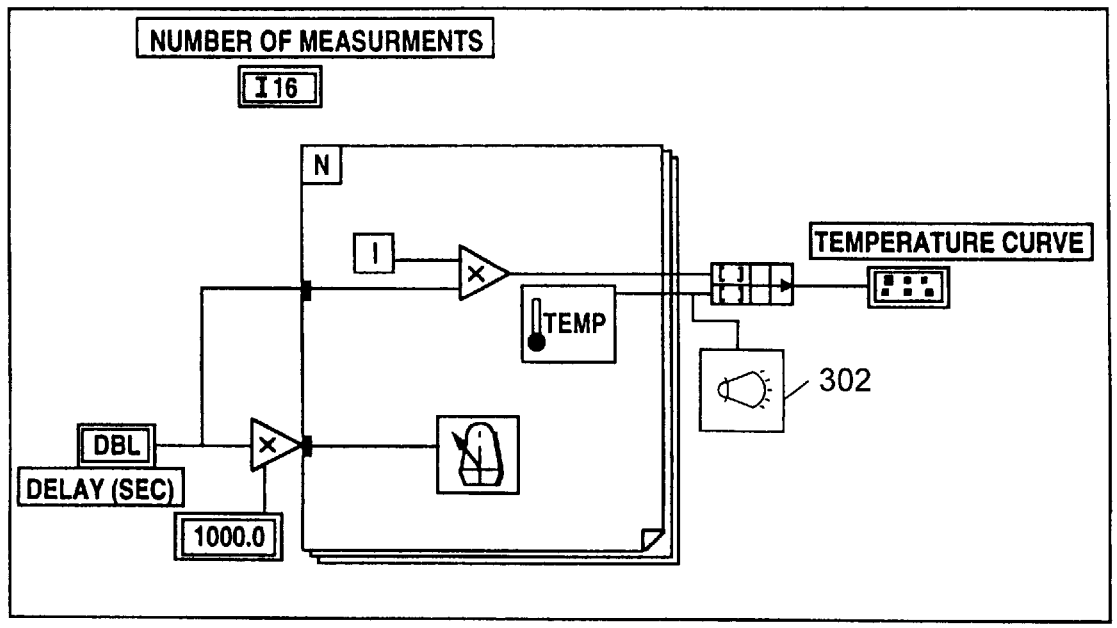

FIGS. 10A and 10B illustrate the front panel and block diagram of a virtual instrument which includes an audio probe icon 302 according to the present invention. Referring to FIG. 10B, the block diagram includes a Temperature icon which comprises a sub-VI that collects data from an input to the computer system, and the remaining nodes in the VI graph the results. The user specifies the number of measurements and the delay between each measurement on the top-level VI front panel. In the VI block diagram illustrated in FIG. 10B, the Temperature sub-VI executes in a loop. The VI collects the measurement during each iteration of the loop. After the loop has executed a specified number of times, the VI passes the data to an icon that graphs it on the front panel of the top-level VI.

The user can connect an audio probe icon 302 to the output of the Temp sub-VI and use the sound selection option to configure the audio probe icon 302 to make desired sounds based on the temperature. Thus, if a temperature signal value surpasses a critical value, the audio probe icon 302 generates a "sizzling" sound. If the temperature signal value goes below a critical value, the audio probe icon 302 generates a "brrrrrr" sound indicating a cold temperature. This provides more sensory information to the user.

Audio Probe—Controls and Graphs

Referring now to FIG. 10A, the audio probe 302 may also be directly connected to controls and indicators in the front panel. As shown in FIG. 10A, the audio probe 302 is connected to the Delay knob control. This audio probe 302 is preferably configured to provide low pitched sounds at low values and higher pitched values as the values increase. The audio probe icon 302 may also be connected to charts and graphs, as shown. In the present disclosure, the term "graph" is intended to include charts, graphs, and other means for displaying data akin to a chart or graph. When the audio probe icon 302 is connected to any part of a graph, the audio probe 302 preferably produces audio signals in response to the graph output or the data displayed on the graph. In another embodiment, instead of connecting an audio probe icon 302 to a graph, the user enables an audio feature for a graph, such as in a pop-up menu, to listen to the graph.

Motor Driven Cursor

Figure 11:
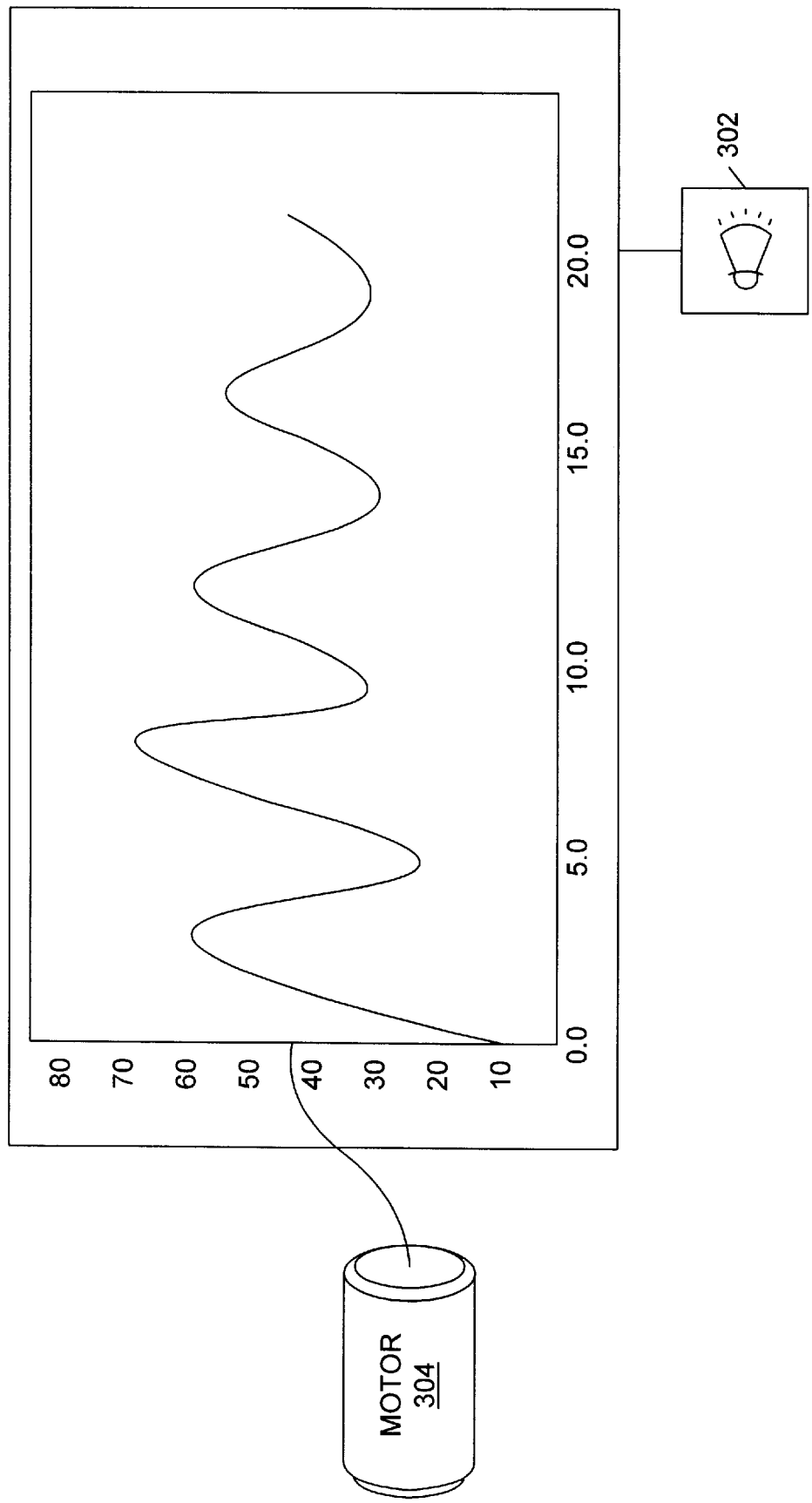
FIG. 11 illustrates a graph including a motor driven audio cursor according to the present invention.

Referring now to FIG. 11, the present invention also comprises a motor driven audible cursor, wherein a cursor drive icon, also referred to as a motor icon 304, is connected to a graph or other indicator and used in conjunction with the audio probe icon 302. As shown in FIG. 11, the cursor driver icon 304 preferably appears as a motor. However, the cursor driver icon 304 may have any of various appearances, as desired. The cursor driver icon 304 is connected to form the "driveshaft" of the cursor control knob, i.e., to move the cursor across the graph.

The motor cursor icon 304 can be configured to drive the graph cursor across the screen in a linear, exponential, or logarithmic rate. The audio probe icon or loudspeaker icon 302 is preferably combined with the motor icon 304 to produce a motor driven audible cursor. Thus the cursor or graph value is provided not only as a numeric or graphical value, but also provided as an audio output through the loudspeaker icon 302. This enables the user to listen to the graph. Also, the value of the cursor may be set to frequency or amplitude modulate an oscillator. Further, dual motor driven cursors can be used to drive stereo speakers.

A method for operating the motor driven cursor to audially present data displayed in a graph is as follows. First, the computer system displays a graph on the video screen which presents data, as shown in FIG. 11. The graph includes a cursor along a first axis. The user then may request the motor driven audible cursor feature to audially generate data displayed in a selected graph. The computer system receives the request to enable the audio probe feature and also receives input regarding the selected graph. In response, the computer system preferably displays audio probe icon 302 connected to the graph. The computer system also displays cursor driver icon 304 connected to the graph. In the preferred embodiment, the user preferably drags the audio probe icon and the cursor driver icon from a palate to the graph.

As discussed above, the cursor driver icon 304 is operable to move the cursor across the axis of the graph, preferably in a variety of manners, such as in a linear, exponential, or logarithmic rate. Once the cursor driver icon 304 appears on the screen, the user then operates the cursor driver icon 304 to move the cursor across the axis of the graph. The user may manually move the cursor across the screen, or use the cursor driver icon 304 to move the cursor at a linear, exponential, or logarithmic rate.

In response to the cursor moving across the axis of the graph, the data of the graph is converted into audio signals during the movement of the cursor across the axis of the graph. The computer system then generates sounds corresponding to the audio signals.

Computer-Readable Memory

The present invention preferably comprises a computer program which is stored on or in a computer-readable memory, such as random access memory, one or more floppy disks, a CD-ROM, or other types of memory. The computer program is executable by a computer system to perform the audio probing steps and motor driven cursor steps described above. The computer program stored in a memory of a computer system also forms a graphical programming system including audio probe and debugging features according to the present invention, as described above.

Conclusion

Therefore, the present invention comprises an audio probe feature for graphical programs. The present invention can be used with visual probing tools to provide a greater amount of information regarding performance or execution of a graphical program. The present invention further comprises a motor driven audible cursor which can be used in conjunction with the audio probe icon to hear the output of a graph or other indicator.

Although the method and apparatus of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

We claim:

1. A method for audially probing signals in a graphical program in a computer system including a display screen, wherein said audial probing is used in debugging the graphical program, the method comprising:

assembling a graphical program comprising a plurality of interconnected function icons, wherein the plurality of interconnected function icons include a first function icon including at least one input and at least one output, ad a first wire connected to the at least one output of the first function icon;

receiving a user input request to enable an audio probe feature to audially generate data transferred on said first wire, wherein said audio probe feature is requested to aid in debugging the graphical program;

beginning execution of said graphical program;

the first function icon executing after said beginning execution, wherein the first function icon generates first data;

converting said first data into first audio signals; and generating sounds corresponding to said first audio signals after said converting said first data into said first audio signals, wherein said converting said first data into first audio signals and said generating sounds corresponding to said first audio signals is performed in response to said audio probe feature being enabled;

wherein said sounds are useable in debugging the graphical program.

2. The method of claim 1, wherein the first data corresponds to a signal, wherein the signal is not an audio signal.

3. The method of claim 1, wherein the graphical program performs a measurement function on a signal;

wherein the first data corresponds to the signal.

4. The method of claim 3, wherein the signal is not an audio signal.

5. The method of claim 1, wherein said receiving said request to enable said audio probe feature comprises selecting said first wire in response to user input.

6. The method of claim 5, further comprising:

displaying on the screen an audio probe icon connected to said first wire after said selecting said first wire and prior to said beginning execution.

7. The method of claim 1, wherein said first data comprises one or more digital signals;

wherein said converting said first data into said first audio signals comprises converting said one or more digital signal comprising said first data into one or more analog audio signals, wherein said generating sounds comprises:

providing said one or more analog audio signals to one or more speakers;

said one or more speakers generating sounds corresponding to said one or more analog audio signals.

8. The method of claim 1, further comprising:

receiving volume control input from a user;

wherein said generating sounds includes generating said sounds at a volume in response to said received volume control input.

9. The method of claim 1, further comprising:

receiving sampling input from a user;

wherein said converting said first data into said first audio signals includes sampling said first data at a sampling rate, wherein said sampling rate is based on said received sampling input.

10. The method of claim 1, wherein the plurality of interconnected function icons further include a second function icon, the second function icon including at least one input and at lest one output, and a second wire connected to the at least one output of the first function icon, the method further comprising:

receiving a user input request to enable an audio probe feature to audially generate data transferred on said second wire, wherein said audio probe feature is requested to aid in debugging the graphical program;

displaying on the screen an audio probe icon connected to said second wire after said selecting said second wire and prior to said beginning execution the second function icon executing after said beginning execution, wherein the second function icon generates second data;

converting said second data into second audio signals;

generating second sounds corresponding to said second audio signals after said converting said second data into second audio signals, wherein said converting said second data into second audio signals and said generating second sounds corresponding to said second audio signals is performed in response to sad audio probe feature being enabled;

wherein said second sounds are useable in debugging the graphical program.

11. The method of claim 1, wherein the plurality of interconnected function icons further includes a second function icon including at least one input and at least one output, and a second wire connected to the at least one output of the second function icon, the method further comprising:

receiving modulation input from a user prior to said beginning execution;

the second function icon executing after said beginning execution, wherein the second function icon generates second data;

converting said second data into second audio signals;

modulating said first audio signals onto said second audio signals, wherein said modulating is performed in response to said receiving modulation input;

generating sounds corresponding to said first audio signals modulated onto said second audio signals after said modulating, wherein said generating sounds is performed in response to said audio probe feature being enabled.

12. The method of claim 1, wherein said graphical program comprises a graphical data flow program.

13. The method of claim 1, wherein said graphical program comprises a virtual instrument.

14. A method for audially probing signals in a graphical program in a computer system including a display screen, the method comprising:

assembling a graphical program comprising a plurality of interconnected function icons, wherein the plurality of interconnected function icons include a first function icon including at least one input and at lest one output, and a first wire connected to the at least one output of the first function icon, wherein the graphical program implements an instrumentation function using a first signal, wherein the first signal is not an audio signal;

receiving a user input request to enable an audio probe feature to audially generate data transferred on said first wire;

beginning execution of said graphical program;

the first function icon executing after said beginning execution, wherein the first function icon generates first data corresponding to the first signal;

converting said first data into first audio signals; and generating sounds corresponding to said first audio signals after said converting said first data into said first audio signals, wherein said converting said first data into first audio signals and said generating sounds corresponding to said first audio signals is performed in response to said audio probe feature being enabled.

15. The method of claim 14, wherein the graphical program performs a measurement function to increase the first signal.

16. The method of claim 14, wherein said audial probing is used in debugging the graphical program.

17. The method of claim 14, wherein said graphical program comprises a virtual instrument.

18. A method for debugging a graphical program in a computer system including a display screen, the method comprising:

assembling on the screen a graphical program comprising a plurality of interconnected function icons, wherein the function icons are connected by a plurality of wires, placing a plurality of audio probe icons in said graphical program, wherein said plurality of audio probe icons are connected to a first plurality of said plurality of wires, wherein said plurality of audio probe icons are also connected to outputs of a first plurality of said plurality of function icons;

beginning execution of said graphical program;

each of said function icons executing after said beginning execution in accordance with said graphical program, wherein each of said function icons generates data;

converting data generated by said first plurality of function icons into audio signals as said first plurality of function icons execute;

generating sounds corresponding to said audio signals as said first plurality of function icons execute, wherein said sounds indicate an execution progression of said graphical program;

wherein said sound are useable in debugging the graphical program.

19. The method of claim 18, wherein each of said function icons generates non-audio data.

20. The method of claim 18, wherein the graphical program implements an instrumentation function.

21. The method of claim 18, further comprising:

receiving sound selection input from a user for each of said plurality of audio probe icons to assign unique sounds to each of said plurality of audio probe icons;

wherein said converting converts said data into audio signals based on said received sound selection input;

wherein said generating sounds comprises generating sounds corresponding to said audio signals to produce said selected sounds as said first plurality of function icons execute, wherein said selected sounds indicate an executing progression of said graphical program.

22. A computer-implemented method for improved debugging of a graphical diagram in a computer system including a display screen, wherein the computer system further includes a sound system including one or more speakers, the method comprising:

assembling on the screen a graphical program comprising a plurality of interconnected function icons, wherein the function icons perform operations in the graphical program;

receiving a user input request to enable an audio autoprobe feature to audially present data associated with or produced by said icons in said graphical program;

beginning execution of said graphical program after said receiving said request to enable said audio autoprobe feature;

executing said plurality of function icons after beginning execution, wherein each of said plurality of function icons generate data as said function icons are executed;

generating sounds in response to said data output from each of said plurality of function icons during said executing said plurality of function icons, wherein said generating sounds in response to said data output from each of said plurality of function icons is performed in response to said audio autoprobe feature being enabled;

wherein said sounds are useable in debugging the graphical program.

23. The method of claim 22, wherein said step of generating sounds is performed for each of said plurality of function icons as said function icons are executed.

24. The method of claim 23, further comprising:

displaying on the screen data output from each of said plurality of function icons proximate to each of said plurality of function icons during said executing said plurality of function icons, wherein said displaying on the screen said data output from each of said plurality of function icons is performed in response to said audio autoprobe feature being enabled.

25. The method of claim 22, wherein said data output from each of said plurality of function icons comprises non-audio data.

26. In an iconic programming system process within a computer system, wherein said process performs functions defined within an iconic program containing a plurality of connected graphical objects, a computer implemented method for audially presenting data associated with or produced by one or more of said plurality of graphical objects of said process, said computer implemented method comprising:

accepting an audio probe request to generate sounds in response to signals associated with or produced by one or more of said plurality of graphical objects, wherein said audio probe request is made to aid in debugging of the iconic program;

beginning execution of said iconic program;

programmatically obtaining data from said one or more of said plurality of graphical objects as said graphical objects are executed;

generating sounds for said one or more of said plurality of graphical objects in response to said programmatically obtaining data, wherein sounds for a respective graphical object are generated as said data is generated by said respective graphical object.

27. The method of claim 26, further comprising:

displaying said data from said one or more of said plurality of graphical objects, wherein data for a respective graphical object is displayed proximate to said respective graphical object as said data is generated by said respective graphical object.

28. The method of claim 26, wherein said data comprises non-audio data.

29. The method of claim 26, wherein said iconic program implements an instrumentation function.

30. A method for audially presenting data in a graph in a graphical program in a computer system including a display screen, the method comprising:

displaying on the screen a graph which presents data, wherein the graph includes a cursor along a first axis;

receiving a request to enable an audio probe feature to audially present the data displayed in said graph;

displaying on the screen a cursor driver icon connected to said graph, wherein said cursor driver icon is operable to move the cursor across said axis of said graph;

operating said cursor driver icon to move the cursor across said axis of said graph;

moving the cursor across said axis of said graph in response to operating said cursor driver icon;

converting said data from said graph into audio signals during said moving the cursor across said axis of said graph;

generating sounds corresponding to said audio signals in response to said converting said data into said audio signals, wherein said generating sounds corresponding to said audio signals is performed during said moving the cursor across said axis of said graph.

31. A computer system which includes an audio probe, comprising:

a display device including a screen;

a graphical program comprising a plurality of interconnected function icons displayed on the video screen, wherein the plurality of interconnected function icons include a first function icon including at lest one input and at least one output, and a first wire connected to the at least one output of the first function icon, wherein the first function icon generates first data;

an audio probe icon coupled to the first function icon which receives data from the first function icon during execution of the graphical program, wherein the audio probe icon provides debugging for the graphical program;

a sound system which converts said first data into first audio signals and generates sounds corresponding to said first audio signals, wherein said sound operates in response to said audio probe icon.

32. A computer-readable storage medium comprising program instructions for audially probing signals in a graphical program in a computer system, the computer system including a display screen, wherein the program instructions are executable to implement:

assembling a graphical program comprising a plurality of interconnected function icons, wherein the plurality of interconnected function icons include a first function icon including at least one input and at least one output, and a first wire connected to the at least one output of the first function icon;

receiving a user input request to enable an audio probe feature to audially generate data transferred on said first wire, wherein said audio probe feature is requested to aid in debugging the graphical program;

beginning execution of said graphical program;

the first function icon executing after said beginning execution, wherein the first function icon generates first data;

converting said first data into first audio signals; and generating sounds corresponding to said first audio signals after said converting said first data into said audio signals, wherein said converting said first data into first audio signals and said generating sounds corresponding to said first audio signals is performed in response to said audio probe feature being enabled;

wherein said sounds are useable in debugging the graphical program.

* * * * *

UNITED STATES PATENT AND TRADEMARK OFFICE
CERTIFICATE OF CORRECTION

PATENT : 6,064,409
DATED : May 16, 2000
INVENTOR(S) : Carsten Thomsen and Jeffrey L. Kodosky It is certified that error appears in the above-identified patent and that said Letters Patent is hereby corrected as shown below:

Claim 1, col. 11, line 46, please delete "ad" and substitute --and--.

Claim 10, col. 12, line 40, please delete "lest" and substitute --least--.

Claim 10, col. 12, line 61, please delete "sad" and substitute --said--.

Claim 21, col. 14, line 29, please delete "executing" and substitute --execution--.

Claim 31, col. 16, line 11, please delete "lest" and substitute --least--.

Signed and Sealed this

Twentieth Day of March, 2001

Attest:

NICHOLAS P. GODICI

*Attesting Officer*   *Acting Director of the United States Patent and Trademark Office*